United States Patent [19]

Takizawa

[11] Patent Number: 5,046,125

[45] Date of Patent: Sep. 3, 1991

[54] LOCK CONTROL METHOD FOR ON-BOARD TERMINAL EQUIPMENT OF A MOBILE TELECOMMUNICATIONS SYSTEM

[75] Inventor: Hiroshi Takizawa, Tokyo, Japan

[73] Assignee: NEC Corporation, Japan

[21] Appl. No.: 558,053

[22] Filed: Jul. 26, 1990

[30] Foreign Application Priority Data

Jul. 28, 1989 [JP] Japan .................................. 1-196151

[51] Int. Cl.$^5$ .............................................. H04K 1/00
[52] U.S. Cl. ...................................... 455/26.1; 380/3; 380/23
[58] Field of Search ...................... 455/26.1; 380/45, 3, 380/23

[56] References Cited

U.S. PATENT DOCUMENTS 4,626,623 12/1986 LaHaye ................................. 380/23
4,847,803 7/1989 Miyano ................................. 380/23

Primary Examiner—Thomas H. Tarcza
Assistant Examiner—David Cain
Attorney, Agent, or Firm—Ostrolenk, Faber, Gerb & Soffen

[57] ABSTRACT

A lock control method for on-board terminal equipment of a mobile telecommunications network surely inhibits persons other than the user or an authorized person person from unlocking the equipment with the intention of originating a call thereon. When a unauthorized person enters a lock code resembling a set first lock code, or unlock code, by chance after a great number of lock codes, the first lock code is replaced with a second lock code. Hence, the unauthorized person cannot unlock the equipment despite that the entered code may coincide with the first lock code. While the unauthorized person may further enter other different lock codes, the second lock code serving as the unlock code will be replaced with the first lock code as the entered code approaches the second lock code.

6 Claims, 5 Drawing Sheets

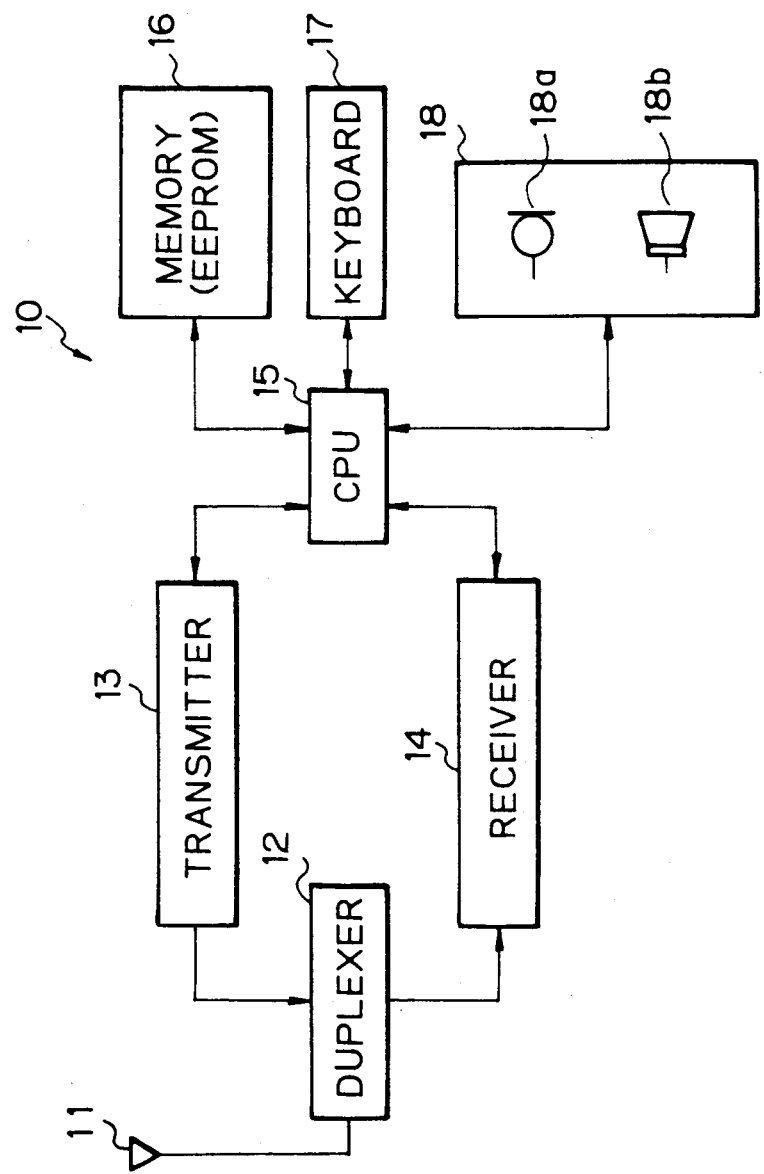

LOCK CONTROL METHOD FOR ON-BOARD TERMINAL EQUIPMENT OF A MOBILE TELECOMMUNICATIONS SYSTEM

BACKGROUND OF THE INVENTION

The present invention relates to a lock control method for on-board terminal equipment of a mobile telecommunications system, particularly a car telephone system.

A car telephone system or similar mobile telecommunications system extensively used today includes on-board terminal equipment each having a controller which is implemented as a CPU, for example. Since this kind of mobile telecommunications system uses electromagnetic waves which is a finite resource, it costs more free than ordinary wired telephone systems. For this reason, the on-board terminal equipment has customarily been provided with a locking function for preventing persons other than the user and an authorized person from originating a call thereon. Specifically, with the locking function, the equipment can be readily locked by anyone, but cannot be unlocked unless a single unlock code of which only the user and authorized person are well aware is entered. The user or the authorized person, therefore, may lock the equipment whenever he or she leaves the vehicle or after using the equipment. This is successful in preventing the other person who, for example, has stolen the vehicle from using the equipment.

The problem with the conventional locking function is that even an unauthorized person who does not know the unlock code may, by chance, unlock the terminal equipment by entering some different codes one after another. Although such an occurrence may be coped with by increasing the number of figures of the unlock code, this will render the operations of the equipment troublesome.

SUMMARY OF THE INVENTION

It is therefore an object of the present invention to provide a lock control method for on-board terminal equipment of a mobile telecommunications system which surely inhibits unauthorized persons from unlocking the equipment.

It is another object of the present invention to provide a generally improved lock control method for on-board terminal equipment of a mobile telecommunications system.

A lock control method for on-board terminal equipment of a mobile telecommunications system which has a locking function for locking the equipment to inhibit a call to be originated on the equipment and an unlocking function for unlocking the equipment of the present invention comprises the steps of providing a first and a second lock code which are selectively used as an unlock code, setting either one of the first and second lock codes as the unlock code, entering a certain lock code, determining whether or not the entered lock code is identical with the unlock code, unlocking the equipment if the entered lock code is identical with the unlock code, determining, if the entered lock code is not identical with the unlock code, whether or not the entered lock code and unlock code have a correlation greater than a predetermined correlation, and substituting, if the correlation is greater than the predetermined correlation, the second lock code for the first lock code and setting the second lock code as a new unlock code.

BRIEF DESCRIPTION OF THE DRAWINGS

The above and other objects, features and advantages of the present invention will become more apparent from the following detailed description taken with the accompanying drawings in which:

FIG. 5 is a block diagram of a mobile telecommunications device suitable for carrying out the embodiments of the present invention.

DESCRIPTION OF THE PREFERRED EMBODIMENTS

Figure 1:
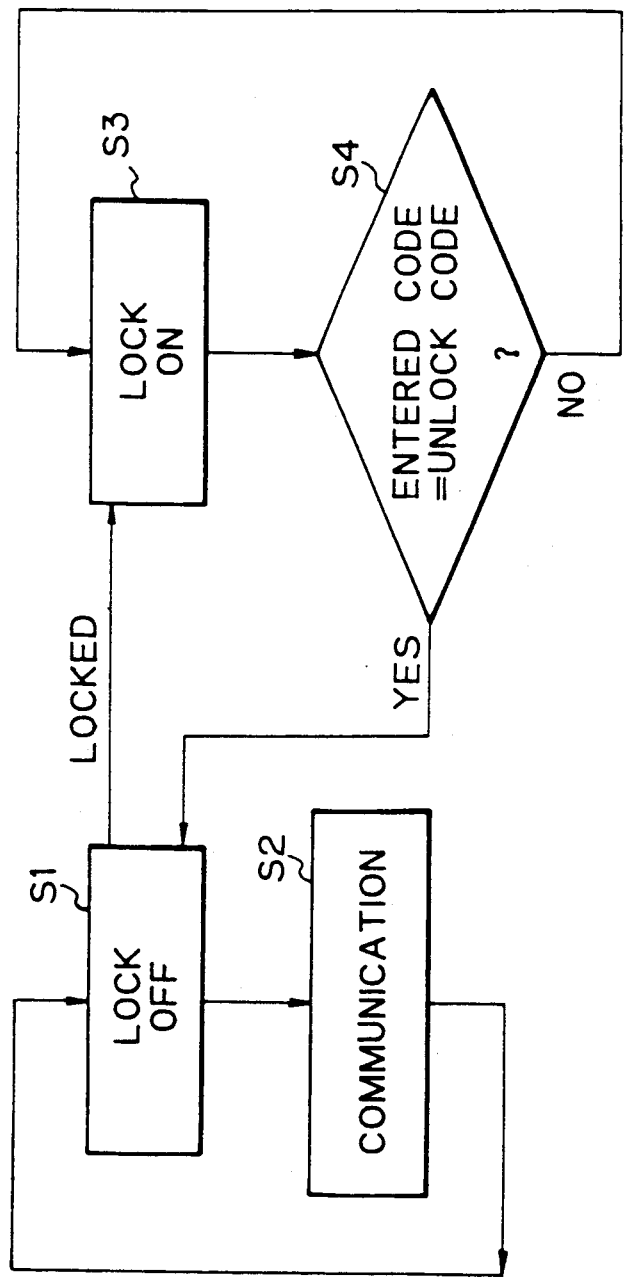
FIG. 1 is a flowchart showing a conventional locking and unlocking procedure associated with on-board terminal equipment of a mobile telecommunications system.

To better understand the present invention, a brief reference will be made to a prior art locking and unlocking procedure associated with on-board terminal equipment of a mobile telecommunications system, shown in FIG. 1. As shown, while the terminal equipment is unlocked, i.e., in a lock-OFF state (step S1), a call may be originated on the equipment to hold conversation with the other party, as desired (step S2). On completion of the conversation, the equipment is restored to the lock-OFF state (step S1). When the equipment is locked while in the lock-OFF state, it is caused into a lock-ON state (step S3) and, therefore, not accessible for the origination of a call any further. To unlock the equipment in the lock-ON state, a certain lock code is entered. Then, the program determines whether or not the entered lock code is coincident with a predetermined unlock code of which the owner or an authorized person is well aware (step S4). If the answer of the step S4 is YES, the equipment is unlocked, i.e., the program returns to the step S1. If the answer of the step S4 is NO, the equipment is held in the locked or lock-ON state.

The problem with the above-described prior art terminal equipment is that even an unauthorized person who does not know the unlock code might in due course unlock the equipment by entering a great number of different codes one after another, as discussed earlier.

Preferred embodiments of the present invention which are free from such a problem will be described with reference to FIGS. 2, 3 and 4.

Figure 2:
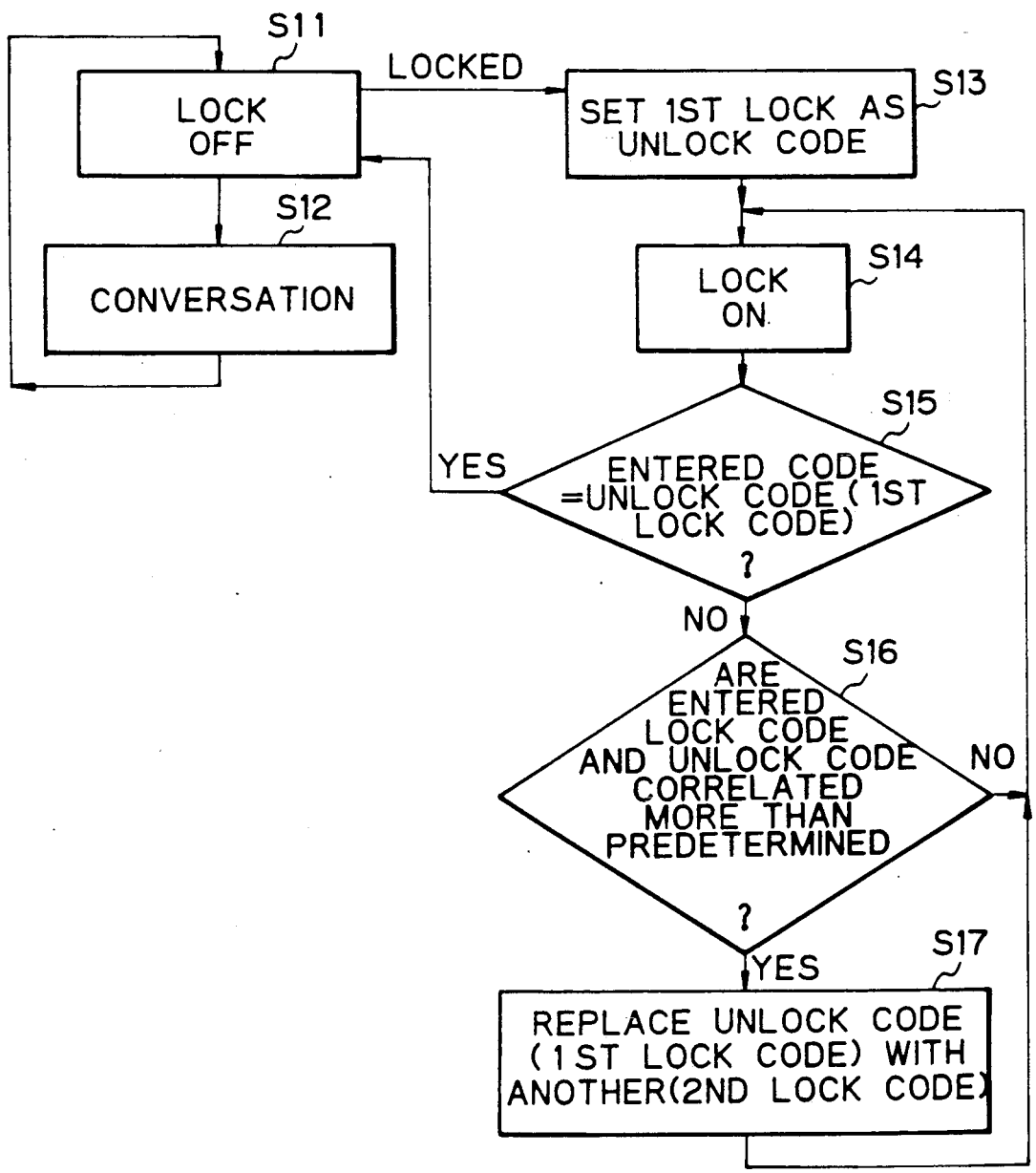
FIG. 2 is a flowchart representative of an embodiment of the lock control method in accordance with the present invention.

FIG. 2 is a flowchart representative of a lock control method embodying the present invention. As shown, the terminal equipment with which the illustrative embodiment is practicable is, while in a lock-OFF state (step S11), allows a call to be originated thereon, as desired (step S12). On completion of the conversation, the equipment is restored to the communicable state (step S11). The illustrative embodiment uses at least two different unlock codes, i.e. a first and a second lock code. One of the first and second lock codes serves as an unlock code in the event of unlocking the equipment. Specifically, to lock the equipment which is in the communicable state (step S11), the first lock code is set on the equipment as an unlock code (step S13). Then, the equipment is caused into a lock-ON state (step S14) to inhibit a call from being originated thereon. When a certain code is entered for the purpose of unlocking the equipment, the program determines whether or not the entered code is identical with the first lock code which was set as the unlock code (step S15). If the answer of the step S15 is YES, the equipment is unlocked (step S11). If the answer of the step S15 is NO, whether or not the entered code has a greater correlation with the first lock code, or unlock code, than a predetermined correlation is determined (step S16). If the answer of the step S16 is YES, the program replaces the first lock code, or unlock code, with the second code and sets the latter as a new unlock code (step S17). Assume that an unauthorized person has entered a number of different codes one after another with the intention of unlocking the equipment until a correlation greater than the predetermined correlation has been set up between the entered code and the set unlock code. Then, the unlock code is replaced with another immediately. It follows that the chance for the unauthorized person to unlock the equipment is scarce since he or she does not know the correct unlock code.

Figure 3:
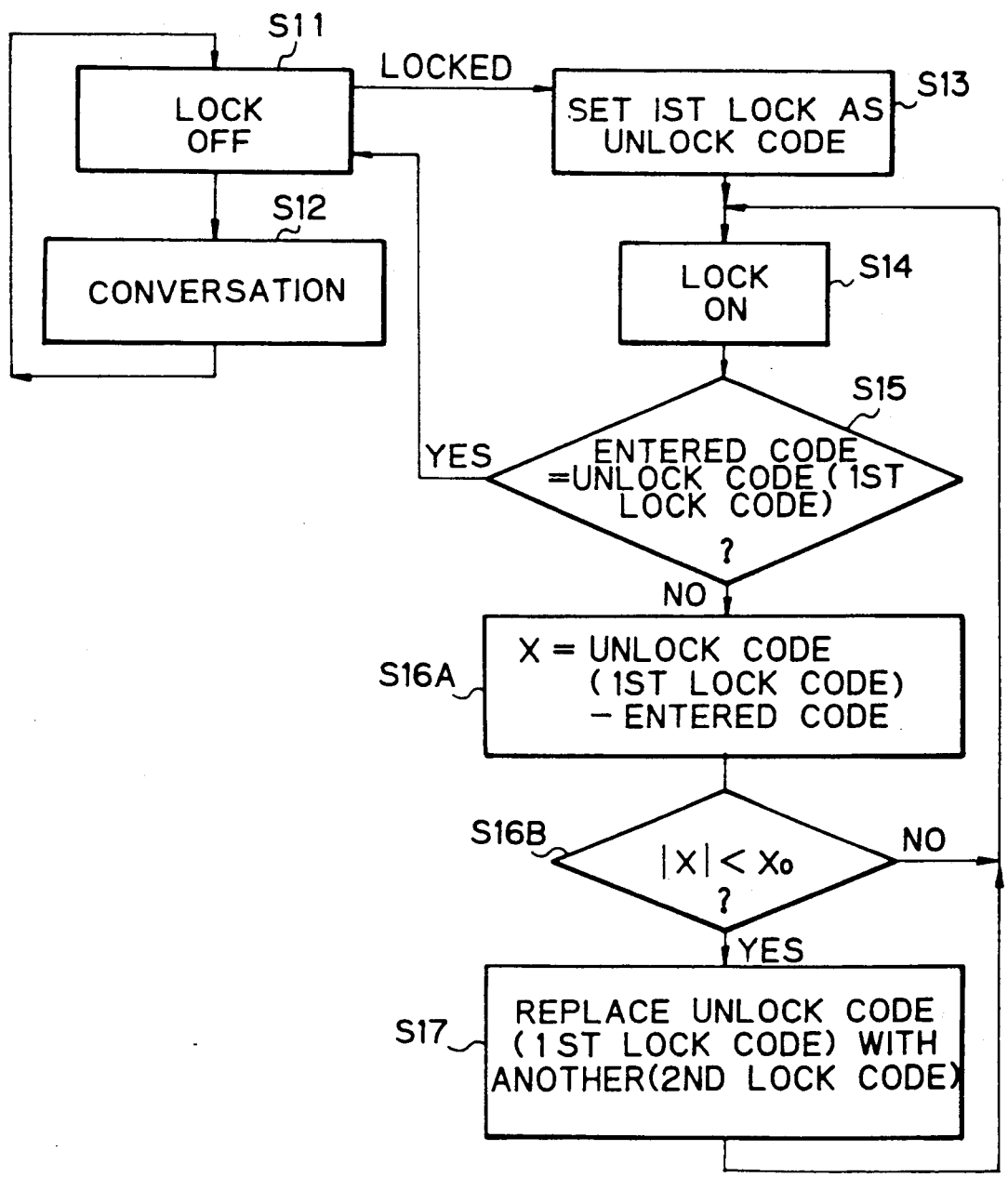
FIG. 3 is a flowchart representative of an anternative embodiment of the present invention.

FIG. 3 is a flowchart representative of an alternative embodiment of the present invention. This alternative embodiment is essentially similar to the previous embodiment except for steps S16A and S16B. Specifically, when the entered code is not identical with the first lock code, or unlock code, (step S15), the program produces a difference X between the entered code and the set unlock code (step S16A). Then, the program determines whether or not the difference X lies in a particular range, i.e., whether or not it satisfies a relation $|X| < X_0$ ($X_0$ being a predetermined value) (step S16B). If the answer of the step S16B is YES, the first lock code or unlock code is replaced with the second lock code (S17), as in the first embodiment. It is to be noted that the predetermined value $X_0$ may be set in the equipment beforehand or may be produced by calculation from the first and second lock codes.

Figure 4:
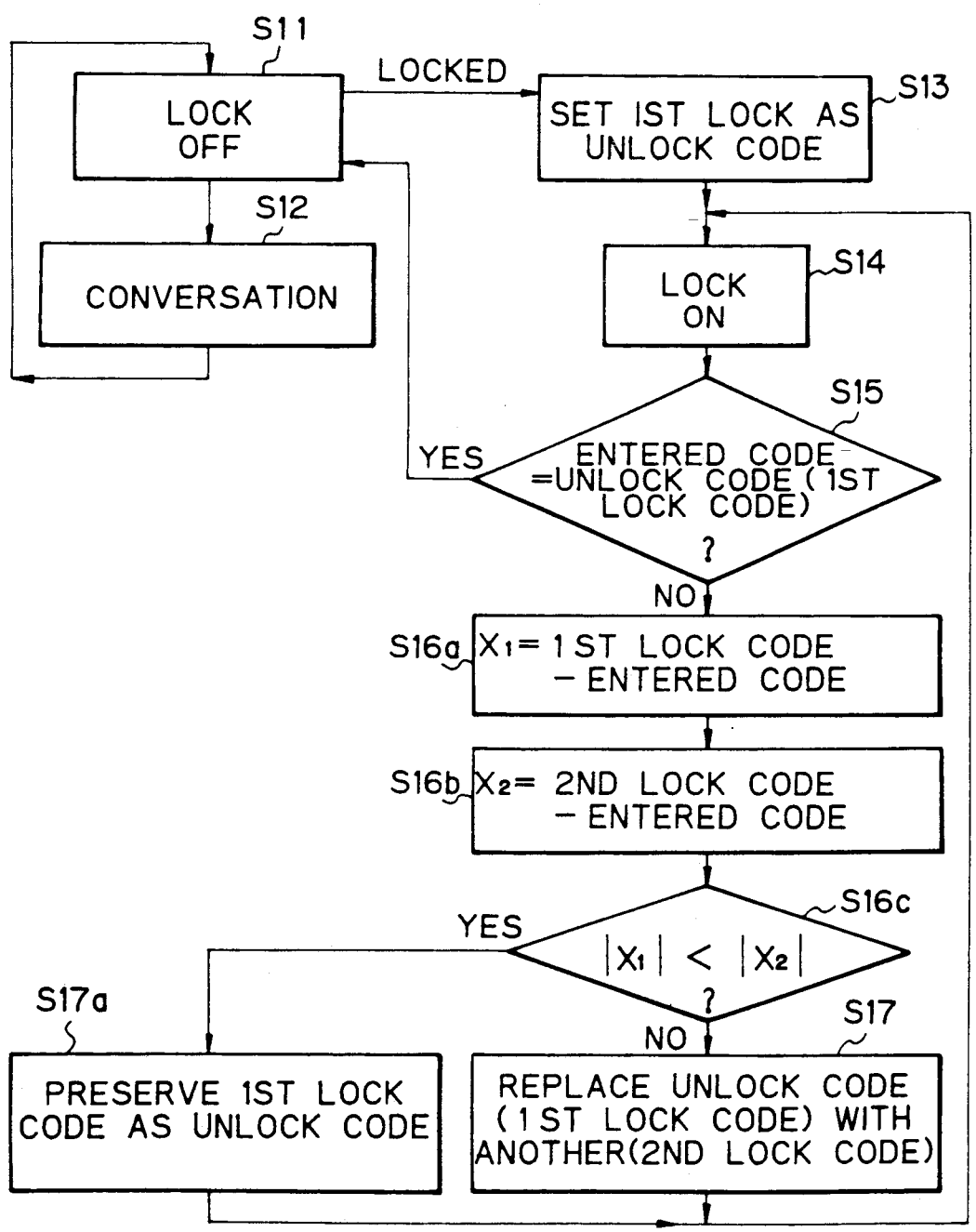
FIG. 4 is a flowchart representative of another alternative embodiment of the present invention.

FIG. 4 shows a specific procedure representative of another alternative embodiment of the present invention which is essentially similar to any one of the foregoing embodiments, except for steps S16a, S16b, S16c and 17a. As shown, when the entered code is not the same as the set first lock code, or unlock code, (step S15), a difference $X_1$ between the entered code and the first lock code and a difference $X_2$ between the entered code and the second lock code are determined in steps S16a and S16b, respectively. Then, whether or not the differences $X_1$ and $X_2$ satisfy a relation $|X_1| > |X_2|$ is determined (step S16c). If the answer of the step S16c is YES, the first lock code is preserved as an unlock code (step S17a) while, if otherwise, the second lock code is substituted for the first lock code and set as a new unlock code. More specifically, one of the first and second lock codes which is more different from the entered code than the other is selected as a new unlock code.

FIG. 5 shows a mobile telecommunications device designated by the reference numeral 10. As shown, the mobile telecommunications device 10 includes an antenna 11 picking up a radio signal and radiating a radio signal. The picked-up radio signal is supplied to a receiver 14 through an antenna duplexer 12. The receiver 14 demodulates the supplied signal to produce an audio frequency (AF) signal which is in turn supplied to a handset 18 through a central processing unit (CPU) 15.

In the handset 18, an earpiece speaker 18b transduces the AF signal to output an audible signal. A mouthpiece microphone 18a transduces an audible signal into an AF signal which is supplied to a transmitter 13 through CPU 15. The transmitter 13 modulates a carrier wave with the supplied AF signal to produce a modulated signal. The modulated signal is routed through the duplexer 12 to the antenna 11 and radiated therefrom.

By the above-described operation, the user can communicate with another party. Authorized persons can prohibit this communication operation using two lock codes as mentioned in detail earlier. The authorized person stores in advance the two lock codes into a memory 16, which may be implemented with an electrically erasable programmable read-only memoty (EEPROM). CPU 5 performs one of the unlock operations described referring to FIGS. 2 to 4. Thus, if a code entered through a keyboard 17 is identical with an unlock code that is either one of two lock codes, CPU 15 allows a person to communicate with other parties. Otherwise. CPU 15 operates in accordance with one of the FIGS. 2 to 4 algorithm and, if necessary, changes the unlock code to the other of the two lock codes.

In summary, it will be seen that the present invention provides a lock control method for on-board terminal equipment which surely inhibits an unauthorized person from unlocking the equipment. Specifically, although an authorized person may successfully enter a code resembling a set first lock code, or unlock code, after a great number of codes, the first lock code is immediately replaced with a second lock code. As a result, the unauthorized person cannot unlock the equipment even when the entered code coincides with the first lock code. While the unauthorized person may further enter other different lock codes, the second lock code serving as the unlock code will be replaced with the first lock code as the entered code approaches the second lock code. This is successful in substantially eliminating the unauthorized use of the equipment. On the other hand, when the user or similar authorized person cannot recall any one of the lock codes or has entered a wrong lock code at first, he or she can surely unlock the equipment by the next unlocking operation. This frees the authorized person from troublesome operations in unlocking the equipment, while making most of the anti-unlock feature available with the equipment.

Various modifications will become possible for those skilled in the art after receiving the teachings of the present disclosure without departing from the scope thereof.

What is claimed is:

1. A lock control method for on-board terminal equipment of a mobile telecommunications system which has a locking function for locking said equipment to inhibit a call to be originated on said equipment and an unlocking function for unlocking said equipment, said method comprising the steps of:
   (a) providing a first and a second lock code which are selectively used as an unlock code;
   (b) setting either one of said first and second lock codes as said unlock code;
   (c) entering a certain lock code;
   (d) determining whether or not the entered lock code is identical with said unlock code;
   (e) unlocking the equipment if the entered lock code is identical with said unlock code;
   (f) determining, if the entered lock code is not identical with said unlock code, whether or not said entered lock code and said unlock code have a correlation greater than a predetermined correlation; and (g) substituting, if the correlation is greater than the predetermined correlation, said second lock code for said first lock code and setting said second lock code as a new unlock code.

2. A method as claimed in claim 1, wherein step (f) comprises the steps of:

(h) producing a difference between the entered lock code and said unlock code; and (i) determining whether or not said difference lies in a predetermined range.

3. A method as claimed in claim 2, wherein step (i) comprises (j) determining whether or not a relation $|X| < X_0$ is satisfied, where X is said difference, and $X_0$ is a predetermined value.

4. A method as claimed in claim 1, wherein step (f) comprises the steps of:

(h) producing a first difference between the entered lock code and said first lock code;

(i) producing a second difference between the entered lock code and said second lock code; and (j) determining a relation between said first and second differences.

5. A method as claimed in claim 4, wherein step (j) comprises (k) determining whether or not a relation $|X_1| > |X_2|$ is satisfied, where $X_1$ and $X_2$ are said first and second differences, respectively.

6. An apparatus comprising:

means for communicating with another party;

means for storing first and second predetermined codes;

means for inhibiting said communicating means from communicating with other parties;

means for manually generating a code to produce an entered code;

means for setting one of said predetermined codes as an unlock code;

means for disabling said inhibiting means when said entered code is identical with said unlock code;

means for determining, if said entered code is not identical with said unlock code, whether or not said entered code has a specific relationship with either one of said first and second predetermined codes; and means for changing said one of said first and second predetermined codes to the other of the same when said entered code has said specific relationship.

* * * * *